Sept. 17, 1963   F. KOURY   3,104,339
ELECTROLUMINESCENT DEVICE
Filed Aug. 8, 1960
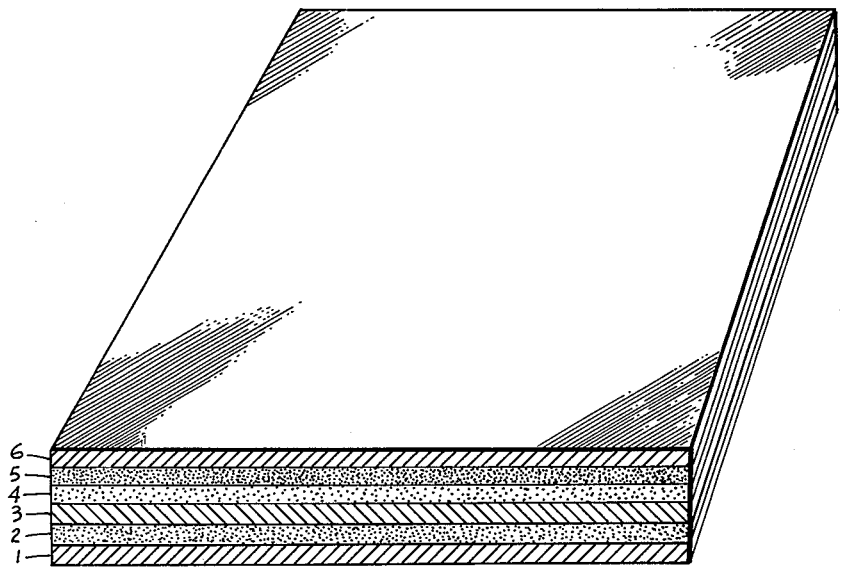
FREDERIC KOURY
INVENTOR.
BY Lawrence Burns,
ATTORNEY 3,104,339
Patented Sept. 17, 1963

3,104,339
ELECTROLUMINESCENT DEVICE
Frederic Koury, Lexington, Mass., assignor to Sylvania Electric Products Inc., a corporation of Delaware
Filed Aug. 8, 1960, Ser. No. 48,260
7 Claims. (Cl. 313—108)

This invention relates to electroluminescent devices, that is, to devices utilizing a substance which emits light under the influence of an electric field, especially a changing field.

Such lamps are generally made commercially by embedding a powdered electroluminescent substance in a glass dielectric material between suitable electrodes, the glass being applied as a frit and then fused.

I find that the addition of a small percentage of powdered zinc oxide to the mixture of powdered glass frit and powdered phosphor, before heating the mixture for fusion, will greatly increase the brightness and efficiency of the phosphor. The increase in brightness and efficiency will be greatest if a layer of some high dielectric constant material such as barium titanate, or a layer including such material, is used between the electroluminescent layer and one of the electrodes.

The effect is especially pronounced with an electroluminescent substance of the zinc sulfide type, copper-activated, but the effect can be obtained with other substances also.

The added oxide may be zinc oxide, and should be below about 5%, and best results will ordinarily be achieved with between 1% to 3%, by volume. About 1% seems to work best with phosphor concentrations of 30% or less of the dielectric material by volume and 3% for greater concentrations, for example, 40% concentration.

Other conducting oxides than zinc can be used, for example, zirconium, titanium or tin oxide.

It is believed that the zinc oxide attaches itself to the zinc sulphide phosphor forming a barrier junction similar to a p-n junction, the zinc sulphide being a p-type conductor and the zinc oxide n-type, or that there is a high field junction as at a metal-to-semi-conductor contact. The oxide may supply oxygen to the surface of the sulfide crystal, in addition to any already present, and may replace any oxygen otherwise lost by heating the phosphor in the frit.

However, the fact that the oxides which work most effectively are conducting oxides indicates their effect is to form a high-field junction with the zinc oxide. Despite the high conductivity of the added oxides, the result is an overall decrease in current passed by the lamp for a given voltage.

Moreover, the added oxide, even when it is zinc oxide, improves the device even when the glass frit already contains many more times the amount of zinc oxide added. The zinc oxide originally present in the frit is present in solid solution as part of the glass; the added oxide apparently does not go into solid solution in the glass frit, but appears to react with the phosphor.

Other features, objects and advantages of the invention will be apparent from the following specification taken in conjunction with the FIGURES in the drawing.

In one example of the invention, 3% zinc oxide, 27% of a copper-activated zinc sulfide electroluminescent phosphor, and 70% of a glass frit of the type shown in copending application Serial No. 365,617, filed July 2, 1953, by Richard M. Rulon, now abandoned, particularly the frit shown as No. 5 on page 4 of said application, were intimately mixed as fine powders. A steel plate 1 having an enamelled ground coat 2 with a conductive surface 3 thereover as in said Rulon application, was sprayed with a powdered mixture of 30% barium strontium titanate and 70% of the No. 4 frit mentioned above the spraying being done in the manner in which the phosphor-ceramic layer was applied in the above-mentioned Rulon application, and heated to about 650° C. for fusion to the conductive layer.

The previously mentioned mixture 5 of zinc oxide, zinc sulfide phosphor and No. 5 glass frit was then sprayed over the layer 4 of frit and barium strontium titanate in the same manner and fused at about 650° C.

A transparent conductive layer 6 of the usual stannous chloride solution was then sprayed onto the latter coating while hot, as in the Rulon application, and a glaze coating over them, if desired.

The characteristics of the resultant electroluminescent lamp were thus measured, with the following results, as compared with a control lamp in which the barium strontium titanate layer was omitted, and the zinc oxide omitted:

TABLE I

30% Phosphor by Volume

BRIGHTNESS AT 120 VOLTS 60 CYCLES (Ft-L)

| Control | Control plus 3% ZnO | Control plus BST [1] | Control plus ZnO plus BST [1] |
|---|---|---|---|
| 0.755 | 0.92 | 0.82 | 1.00 |

EFFICIENCY AT 60 CYCLES (LPW)

| 2.37 | 4.0 | 3.00 | 4.29 |

EFFICIENCY AT 250 CYCLES (LPW)

| 2.05 | 2.88 | 2.32 | 3.78 |

EFFICIENCY AT 400 CYCLES (LPW)

| 2.14 | 2.54 | 2.19 | 3.61 |

POWER FACTOR Cos θ

| 0.269 | 0.162 | 0.199 | 0.175 |

[1] BST, barium strontium titanate.

A similar lamp with 40% phosphor concentration by volume was also made, and a control with 40% phosphor by volume. The lamp gave the following results:

TABLE II

40% Phosphor

BRIGHTNESS AT 60 CYCLES 120 VOLTS (Ft-L)

| Control | Control plus 1% ZnO | Control plus BST [1] | Control plus ZnO plus BST [1] |
|---|---|---|---|
| 1.25 | 1.42 | 1.50 | 2.00 |

EFFICIENCY AT 60 CYCLES (LPW)

| 0.325 | 2.46 | 3.05 | 3.12 |

EFFICIENCY AT 400 CYCLES

| 0.522 | 2.60 | 2.74 | 2.77 |

POWER FACTOR Cos θ

| 0.884 | 0.236 | 0.200 | 0.200 |

[1] BST, barium strontium titanate.

The barium strontium titanate used had a dielectric constant of about 8000 to 10,000 at a frequency of 1000 cycles per second. The percentage of zinc oxide present is included in the phosphor volume.

The brightness of otherwise similar lamps, with oxides other than zinc oxides, gave the following results at 120 volts 60 cycles per second.

| Oxide | Brightness | Current milliamperes |
|---|---|---|
| Zinc oxide | 1.50 | 1.00 |
| Zirconium dioxide | 1.52 | 0.85 |
| Titanium dioxide | 1.52 | 1.28 |
| Tin oxide | 1.42 | 1.20 |

It is seen that zirconium dioxide gives the brightest lamp for the least current. The titanium oxide used was rutile.

What I claim is:

1. The method of making an electroluminescent layer, said method comprising mixing a semi-conducting oxide, an electroluminescent phosphor and glass frit, all in powdered form, and then heating the resultant mixture to a temperature high enough to fuse the frit and embed the phosphor therein.

2. The method of making an electroluminescent layer, said method comprising mixing in powdered form a semi-conducting oxide, a zinc sulphide electroluminescent phosphor and a glass frit having a melting point above that of the phosphor, and then heating the resultant mixture to a temperature high enough to fuse the frit and embed the phosphor therein.

3. A powdered mixture for making an electroluminescent coating, said mixture comprising an electroluminescent phosphor, glass frit and a semi-conducting oxide.

4. A powdered mixture for making an electroluminescent coating, said mixture comprising a zinc sulfide electroluminescent phosphor, glass frit and a semi-conducting oxide.

5. An electroluminescent device comprising two electrodes and a layer therebetween including a semi-conducting oxide, an electroluminescent phosphor and glass frit.

6. An electroluminescent device comprising two electrodes and a layer therebetween including a glass frit, an electroluminescent phosphor and about 1% to about 3% of a semi-conducting oxide.

7. An electroluminescent device comprising two electrodes and a layer therebetween including a semi-conducting oxide, an electroluminescent phosphor and a fused glass frit, and an additional layer between said electrodes, said additional layer being of powdered material of high dielectric constant embedded in a fused glass frit.

References Cited in the file of this patent

UNITED STATES PATENTS

| | | |
|---|---|---|
| 2,857,541 | Etzel et al. | Oct. 21, 1958 |
| 2,866,117 | Walker et al. | Dec. 23, 1958 |